United States Patent
Liu

(10) Patent No.: US 8,442,551 B2
(45) Date of Patent: May 14, 2013

(54) METHOD AND DEVICE FOR AUTHENTICATION AND AUTHORIZATION CHECKING ON LBS IN WIMAX NETWORK

(75) Inventor: Meili Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 12/664,055

(22) PCT Filed: Jun. 12, 2008

(86) PCT No.: PCT/KR2008/003272
§ 371 (c)(1),
(2), (4) Date: Dec. 10, 2009

(87) PCT Pub. No.: WO2008/153321
PCT Pub. Date: Dec. 18, 2008

(65) Prior Publication Data
US 2010/0186069 A1     Jul. 22, 2010

(30) Foreign Application Priority Data

Jun. 12, 2007 (CN) .......................... 2007 1 0126101

(51) Int. Cl.
H04W 24/00 (2009.01)
(52) U.S. Cl.
USPC ..... 455/456.1; 455/457; 455/411; 455/432.1; 455/435.2

(58) Field of Classification Search ....... 455/456.1–457, 455/411, 432.1, 432.2, 435.2
See application file for complete search history.

(56) References Cited

U.S. PATENT DOCUMENTS

| 8,032,115 | B1 * | 10/2011 | Breau et al. .................... 455/411 |
| 2005/0026596 | A1 | 2/2005 | Markovitz |
| 2005/0255853 | A1 | 11/2005 | Ewert et al. |
| 2006/0185013 | A1 | 8/2006 | Oyama et al. |
| 2007/0004430 | A1 | 1/2007 | Hyun et al. |
| 2007/0135048 | A1 | 6/2007 | Fiat |
| 2008/0108322 | A1 * | 5/2008 | Upp .............................. 455/411 |
| 2010/0329129 | A1 * | 12/2010 | Kroselberg et al. ........... 370/252 |

* cited by examiner

Primary Examiner — Kamran Afshar
Assistant Examiner — Sayed T Zewari
(74) Attorney, Agent, or Firm — Jefferson IP Law, LLP

(57) ABSTRACT

A device for performing authentication and authorization checking on Location-Based Service (LBS) in a WiMAX network is provided. This device strengthens security for LBS in a WiMAX network, and protects privacy right of subscribers to LBS. The device includes a Location Assessment module (LA) for performing the location assessment, a Location Coordination and control module (LC) for controlling LBS assessment and calculation of a location of a mobile terminal. The device also includes an Authentication/Authorization/Accounting module (AAA) that includes a memory storing authentication and authorization information. The AAA also includes an authentication processing module for authenticating an LBS, and an authorization checking processing module for checking whether an LBS client and a Mobile Station (MS) requesting services from the LBS are authorized to request the location of a target MS.

36 Claims, 8 Drawing Sheets

ARCHITECTURE OF SOLUTION 1

PERFORMING AUTHENTICATION ON LBS SERVICES ACCORDING TO SOLUTION 1

PERFORMING FAILED AUTHORIZATION CHECKING ON LBS CLIENT AND AUTHENTICATION ON LBS SERVICES ACCORDING TO SOLUTION 2

METHOD AND DEVICE FOR AUTHENTICATION AND AUTHORIZATION CHECKING ON LBS IN WIMAX NETWORK

TECHNICAL FIELD

The present invention relates to a method and device for authentication and authorization checking on Location Based Service (LBS) in a Worldwide Interoperability for Microwave Access (hereafter, abbreviated as Wimax) network.

BACKGROUND ART

Mechanism for checking LBS's confidentiality in a Wideband Code Division Multiple Access (WCDMA) network has been stipulated in the 3rd Generation Partnership Project (3GPP) technical specifications of 3GPP TS 22.071 and 3GPP TS 23.271. And the modules associated with privacy checking include:

(1) Privacy Profile Register (PPR)

The PPR has a major function of implementing privacy checking. Its address is saved in Home Location Register (HLR) or Home Subscriber Server (HSS). Home Mobile Location Centre (H-GMLC) can access the PPR through Lpp interface. The PPR can be either an independent entity or integrated in H-GMLC. In the PPR, subscription information on a subscriber's privacy is saved. No LBS client is enabled by default. The privacy properties include:

Codeword: a level which is adopted by a target UE to determine which requestors are permitted or the UE's location information. There is no specific definition in 3GPP. It is configured by operators according to the conditions of their own LBS;

Privacy exception list: determining which LBS clients, which services and which types of LBS clients can locate certain UE;

Privacy on service type: determining which types of services permit a LBS client to obtain the location of the target UE;

Beyond privacy indicator: determining the applicability of the privacy exception list.

A requestor should provide certain target UE's codeword when requesting for the UE's location information. The codeword can be provided by the requestor and forwarded by LBS Client to the target UE for checking. Also, the codeword can be registered in LBS Client by the target UE or the subscriber in advance and checked in LBS server. The generation or distribution of a codeword is not stipulated in 3GPP specifications. In addition to the basic functions of the codeword mentioned above, an enhanced codeword contains a specific time period and times for which the codeword can be used.

(2) Pseudonym Mediation Device (PMD)

The PMD functions to map or decrypt a pseudonym into a true identifier of UE, such as International Mobile Subscriber Identifier (IMSI) or Mobile Station Integrated Service Digital Network (MSISDN) number. The PMD can be either an independent equipment or integrated in PPR, Gateway Mobile Location Center (GMLC) or other equipment in the network. Details on the functions of PMD are not specified in 3GPP.

In 3GPP, the flow of authorization checking is illustrated in FIG. 1, in which steps are:

101 GMLC sends to PPR a location based service authorization request message, which contains the following parameters:

Target UE identifier (ID) including either MSISDN or IMSI or both, optional;

LBS client ID;

LBS client type, such as value-added service, emergency service, legal listening;

Service type, optional

Codeword, optional;

Location type, such as "current location", "current or latest known location", "initial location";

and so on;

If PMD is integrated in PPR, the UE ID included in the message uses the UE's pseudonym instead of the true UE ID;

102 If the location based service authorization request message contains the target UE's pseudonym, PPR will enables the PMD function to determine the target UE's true UE ID, such as IMSI or MSISDN. Based on the privacy information on the target UE's subscription, PPR performs privacy checking, and the checking result is returned to GMLC as a location based service authorization response message. If the location request is prohibited, the location based service authorization response message contains only a location request prohibition indicator. Otherwise, it contains the following permission indicators:

The location request is not permitted;

The location request is permitted without being informed to UE;

The location request is permitted with being informed to UE;

The location request needs to be informed to UE and verified by UE, and the location request can be authorized only if it passes the verification or has no response to the informing act;

The location request needs to be informed to UE and verified by UE, and the location request can be authorized only if it passes the verification.

The mobile Wimax (Institute of Electrical and Electronics Engineers (IEEE) 802.16e, USA) technology is based on fixed Wimax. Therefore, support to location based service is not yet considered in the existing mobile Wimax standard. And the location based service, namely LBS, is also a significant service in a mobile communication network. Thus, the network group of Wimax Forum (NWG) has specified the requirements on LBS in the Wimax network architecture version 1.5 which is being established, and a LBS group under NWG is devoted to establishing specifications on Wimax network LBS. So far, delegates from corporations like Huawei and Intel, etc. have proposed the architecture and basic protocol flow for Wimax network LBS, but no sound solution has been set forth by any delegate regarding authentication and authorization of Wimax network LBS.

In addition, as mentioned previously, 3GPP has stipulated a method for privacy checking. It is obvious, however, that the method cannot be directly applied in Wimax network. The reasons are as follows.

(1) The overall network architecture of 3GPP is completely different from that of Wimax.

In 3GPP, network entities generally include UE, base station (Node B), radio network controller (RNC), mobile switching center (MSC) or mobile switching server (MSC Server) and media gateway (MGW), general packet radio service (GPRS) support node (SGSN), gateway GPRS support node (GGSN), and home location register (HLR). On the other hand, network entities in Wimax include mobile station (MS), base station (BS), access service network gateway (ASN GW), authentication/authorization/accounting (AAA) module, policy function module (PF), home agent (HA) and foreign agent (FA). So that Wimax is a brand-new network architecture that is totally different from 3GPP.

(2) Privacy checking mechanism for LBS in 3GPP is difficult to understand and poor in practicability.

The privacy checking mechanism including modules of PPR and PMD, and codeword, etc., in 3GPP is difficult to understand, which does not comply with the original intention of Wimax network to be easy in understanding and practical in application.

(3) Privacy checking mechanism for LBS in 3GPP is complex.

The privacy checking mechanism for LBS in 3GPP takes into account nearly all kinds of issues, such as setting two separate entities, PPR and PMD, to implement privacy checking, using pseudonym and the like. Such all-round consideration is naturally accompanied by the problem of complexity. And this does not comply with the principle of simple and practical of Wimax network, either.

(4) Operators have to deal with too much blankness left in privacy checking mechanism for LBS in 3GPP.

If an operator intends to utilize LBS privacy checking, it has to devise by itself many mechanisms on the basis of relevant specifications in 3GPP. Operators need to design, for example, how to use codeword, how to generate and distribute codeword, how to check, etc., as the most critical mechanisms. Moreover, although pseudonym can be applied according to 3GPP, functions associated with PMD needs to be defined by operators themselves. On the other hand, any operator generally expects to deploy a service as quickly as possible. This needs a set of mature standards rather than spending plenty of extra time and efforts in perfecting and complementing the existing specifications.

DISCLOSURE OF INVENTION

Technical Solution

To solve the above problems, present invention aims at proposing a simple and practical method and device for authentication and authorization checking on location based service (LBS) in Wimax network.

To achieve the object mentioned above, a device for authentication and authorization checking on LBS in Wimax network comprising:

a location assessment module (LA) adapted to performing location assessment, a location coordination and control module (LC) adapted to initiate LBS assessment, location calculation;

a memory included in AAA and adapted to store LBS subscription information;

an authentication processing module included in AAA and responsible for LBS authentication;

a memory included in LS and adapted to store authorization list;

an authorization checking module included in LS and responsible for authorization checking on MO MS.

The present invention provides a method for authentication and authorization checking on LBS in Wimax network. This strengthens security for LBS in Wimax network, protects privacy right of subscribers to LBS, and fills up the blankness in the current Wimax standards.

BEST MODE FOR CARRYING OUT THE INVENTION

Figure 1:
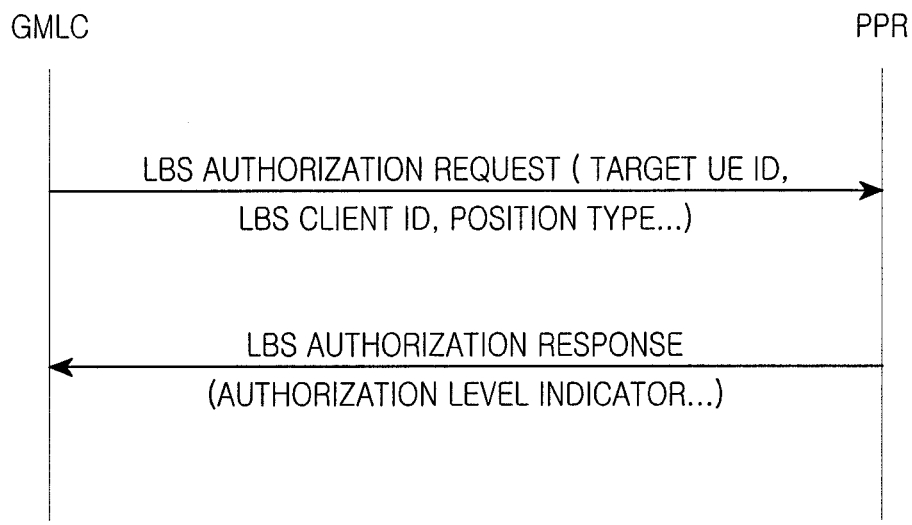
FIG. 1 shows a flow of authorization checking in 3GPP.

The present invention provides two solutions as follows.

Solution 1: AAA implements LBS authentication, and LS implements authorization checking on location requestor.

In Solution 1, AAA implements LBS authentication, and LS implements authorization checking on a location requestor (including an external LBS client or a MS requesting for location (MO MS)). Solution 1 can include the following two aspects.

First, before permitting a user to use LBS, an operator needs to register the user's LBS. And it is necessary to save information on the user's LBS services in the database of the operator's AAA and location server (LS) or in any other memory. Such saving primarily includes:

(1) Saving in AAA the subscription information on the LBS services that has been registered by a user in the operator's Wimax network, i.e., saving in AAA the LBS services that can be used by each LBS user and the corresponding quality of service (QoS) parameters, such as the registered LBS service types, precision requirements and so on. Information to be saved is specified by the operator according to its service operation. The method proposed in present invention has no restriction on the parameter and format of the subscription information. In addition, the user can add, delete or modify his or her subscription information conveniently;

(2) Saving in LS the privacy related information on the LBS that is registered by the user in the operator's Wimax network, i.e., saving in LS the information on security of the user's LBS services, such as which external clients or users can query about the user's location information, etc. Such information includes, for example, the list of LBS clients permitted to access and the list of MSs permitted to access. The determination as to what privacy information on LBS is stored in LS and what format is used is made by the operator who runs such service. Any particular parameter or format is not specified in present invention. A user can conveniently add, delete or modify his or her privacy information. In addition, in the detailed description and following embodiments of present invention, the term "privacy" also involves authorization and security. And privacy checking can be also described as authorization checking and LBS-related security checking.

The other aspect of present invention provides a processing flow of authentication and authorization on LBS services in Wimax network, based on "Wimax End-to-End Network System Architecture" version 1.0 (R1.0) published by Wimax Forum in March 2007. The processing flow comprises mainly the following three processing flows.

(1) Authorization Checking on LBS Client

During the location process initiated by a LBS client, after a location request message has been sent from the LBS client to LS, LS first performs authorization checking to determine whether the client is a LBS client permitted to access.

(2) Authentication on LBS Service

For LBS initiated by the LBS client, a particular process is implemented after LS has performed authorization checking on the LBS client. On the other hand, for LBS initiated by MS, the particular process is implemented directly. The particular process is that LS sends an authentication request message to AAA after LS has received the location request, then authentication on the LBS service is performed in AAA and the result of the authentication is returned to LS; if the authentication is successful, the authentication response message includes "authentication passes" or "authentication succeeds", otherwise, it includes "authentication fails", and then the location response message is returned to MS or the LBS client, with the message containing a parameter of location rejection and the reason value being "authentication fails".

(3) Authorization Checking on MS

After the authorization checking on LBS client and authentication on LBS, authorization checking on MS is required so as to check such information saved in LS as the list of MSs permitted to locating, the list of MSs prohibited from locating, etc., for MSs to be located (or target MSs, for convenience of description, it is called MT MS in present invention). A MS which obtains location information is called MO MS in present invention. If a MO MS wants to locate itself, the MO MS is also called MT MS. If a MO MS is in the list of MSs permitted to locating for a MT MS, the authorization checking passes. Otherwise, if the MO MS is in the list of MSs prohibited from locating, the authorization checking fails. And a location response message is returned to the party (either a LBS client or a MS) that initiates the LBS, with the message indicating that the request is rejected and carrying a reason value that the authorization checking fails. If the MO MS is in neither the list of MSs permitted to locating nor the list of MSs prohibited from locating, the MT MS is queried.

If the MT MS indicates that the request is permitted, the subsequent LBS process occurs, such as routing the request to serving location control (Serving LC) for location assessment and calculation, etc. If the MT MS indicates that the request is forbidden, a location response message is returned to the party (either a LBS client or a MS) that initiates the LBS, with the message indicating that the request is rejected and carrying a reason value that the authorization checking fails.

Solution 2: AAA implements both LBS authentication and authorization checking on location requestor.

In Solution 2, AAA implements not only LBS authentication but also authorization checking on a location requestor (including and external LBS client and a MS requesting for location (MO MS)). Solution 2 includes the following two aspects.

First, before permitting a user to use LBS, an operator needs to register the user's LBS. And it is necessary to save information on the user's LBS services in the database of the operator's AAA or in any other memory. The information refers mainly to subscription information and authorization information for the user.

(2) Subscription Information

Saving in AAA the subscription information on the LBS services that has been registered by a user in the operator's Wimax network, i.e., saving in AAA the LBS services that can be used by each LBS user and the corresponding quality of service (QoS) parameters, such as the registered LBS service types, precision requirements and so on. Information to be saved is specified by the operator according to its service operation. The method proposed in present invention has no restriction on the parameter and format of the subscription information. In addition, the user can add, delete or modify his or her subscription information conveniently;

(2) Authorization Information

Saving in AAA the privacy related information on the LBS that is registered by the user in the operator's Wimax network, i.e., saving in LS the information on security of the user's LBS services, such as which external clients or users can query about the user's location information, etc. Such information includes, for example, the list of LBS clients permitted to access and the list of MSs permitted to access. The determination as to what privacy information on LBS is stored in LS and what format is used is made by the operator who runs such service. Any particular parameter or format is not specified in present invention. A user can conveniently add, delete or modify his or her privacy information. In addition, in the detailed description and following embodiments of present invention, the term "privacy" also involves authorization and security. And privacy checking can be also described as authorization checking and LBS-related security checking.

The other aspect of present invention provides a processing flow of authentication and authorization on LBS services in Wimax network, based on "Wimax End-to-End Network System Architecture" version 1.0 (R1.0) published by Wimax Forum in March 2007. The processing flow comprises mainly the following steps.

(1) LS request AAA for authentication and authorization checking after LS receives a location request from LBS client or MS;

(2) AAA performs LBS authentication and authorization checking on a location requestor (including MO MS and LBS client (if necessary));

(3) AAA returns the authentication and authorization checking response to LS to indicate whether the authentication and authorization checking succeeds or fails, with the response carrying the reason value in the case of failure.

In summary, present invention provides the two solutions for LBS authentication and authorization checking in Wimax network. If a location request comes from a LBS client or MS that is not permitted, the request will be rejected by LS or AAA. So, security is guaranteed for LBS in Wimax network to some extent. What's more, this method is more simple and practical than the counterpart in 3GPP. Thus, present invention offers alternative solutions of authentication and authorization checking for operators when they intend to provide LBS services in Wimax network. Also, present invention fills up certain blankness in the current Wimax standards.

To achieve the object mentioned above, a method for implementing LBS authentication and authorization checking in Wimax network is proposed in present invention. In the Wimax network, LBS structure comprises a location agent (LA), a location controllor (LC), AAA, a location server module (LS) and a LBS client. Modules responsible for authentication and authorization checking include an authentication processing module and a LBS subscription information memory in AAA as well as an authorization list memory and an authorization checking module in LS.

Two solutions are proposed in present invention.

Solution 1: AAA implements LBS authentication, and LS implements authorization checking on location requestor.

In Solution 1, the structure comprises the authentication processing module and the LBS subscription information memory in AAA, and the authorization list memory and the authorization checking module in LS.

Steps in Solution 1 are as follows.

1. Presetting Information

Before LBS services are utilized in Wimax network, the following information should be pre-stored in Wimax network entities:

1) saving in AAA the subscription information on the LBS services that has been registered by a user in the operator's Wimax network, the user can add, delete or modify his or her subscription information conveniently;

2) saving in LS the privacy related information on the LBS that is registered by the user in the operator's Wimax network, and the user can conveniently add, delete or modify his or her privacy information.

2. Processing Flow

1) For the location process initiated by the LBS client, LS firstly performs authorization checking;

2) Having received the location request, LS sends an authentication request message to AAA, an the LBS authentication is fulfilled in AAA;

3) During the process of authorization checking on MO MS, if the MO MS is in the list of MSes permitted to locating for a MT MS, the authorization checking passes; otherwise, if the MO MS is in the list of MSs prohibited from locating, the authorization checking fails, and a location response message is returned to the party (either a LBS client or a MS) that initiates the LBS, with the message indicating that the request is rejected. If the MO MS is in neither the list of MSs permitted to locating nor the list of MSs prohibited from locating, the MT MS is queried. If the MT MS indicates that the request is permitted, the authorization checking passes. If the MT MS indicates that the request is forbidden, it is indicated that the request is rejected.

Solution 2: AAA implements both LBS authentication and authorization checking on location requestor.

The structure of Solution 2 comprises the LBS subscription information memory, the authorization list memory, the authentication processing module and the authorization checking module.

Steps in Solution 2 are as follows.

1. Presetting Information

Before LBS services are utilized in Wimax network, the following information should be pre-stored in the Wimax network entity AAA:

1) the subscription information on the LBS services that has been registered by a user in the operator's Wimax network, the user can add, delete or modify his or her subscription information conveniently;

2) the privacy related information/authorization checking related information on the LBS that is registered by the user in the operator's Wimax network, and the user can conveniently add, delete or modify his or her privacy information.

2. Processing Flow (1) LS applies to AAA for e authentication and authorization checking after LS receives a location request from LBS client or MS;

(2) AAA performs LBS authentication and authorization checking on a location requestor (including MO MS and LBS client (if necessary));

(3) AAA returns the authentication and authorization checking response to LS to indicate whether the authentication and authorization checking succeeds or fails, with the response carrying the reason value in the case of failure.

Embodiments

The embodiments of present invention have been illustrated in the above two solutions.

Solution 1: AAA implements LBS authentication, and LS implements authorization checking on location requestor.

Figure 2:
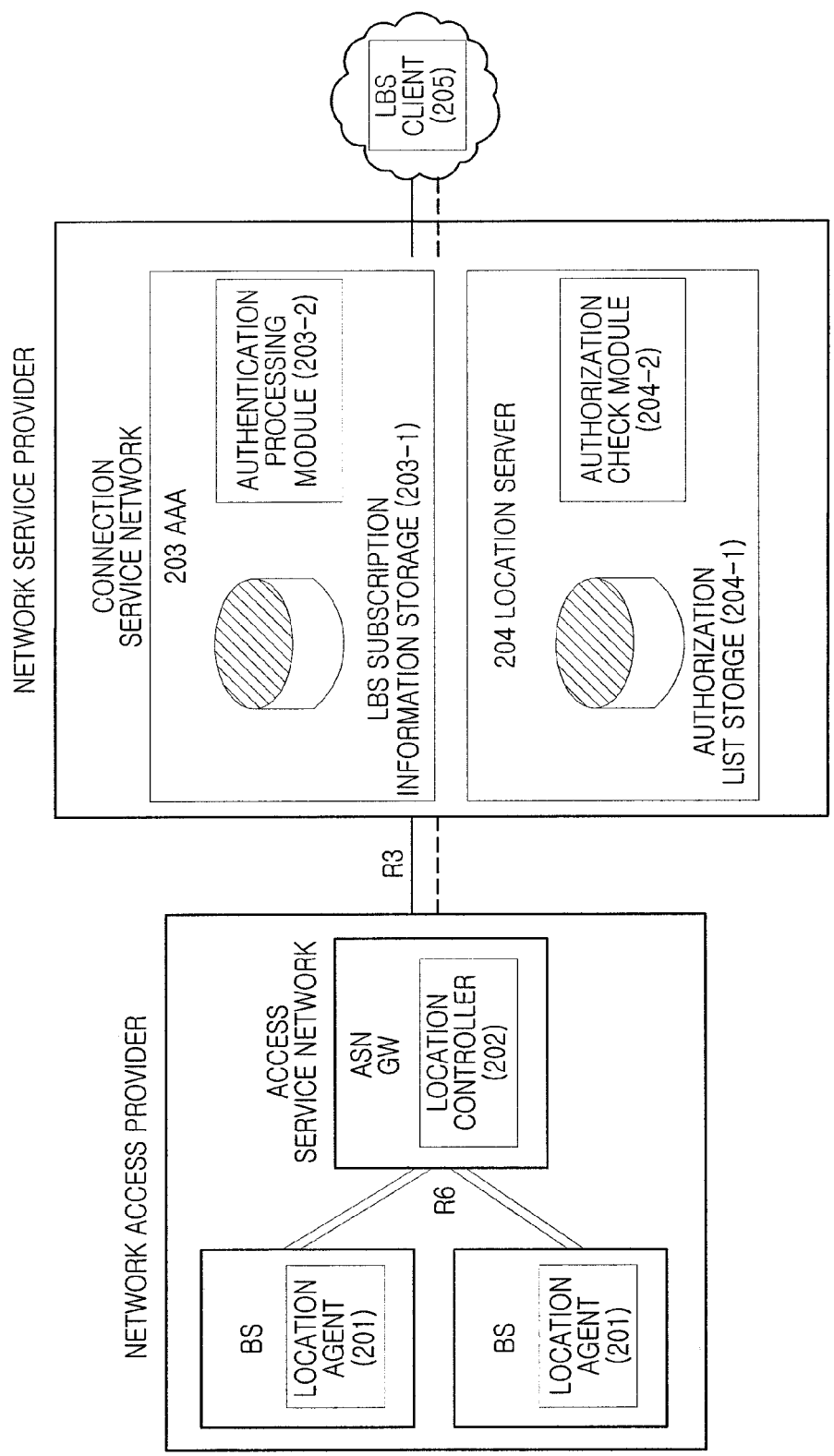
FIG. 2 is a block diagram of Solution 1 for LBS authentication and authorization checking in Wimax network.
Figure 3:
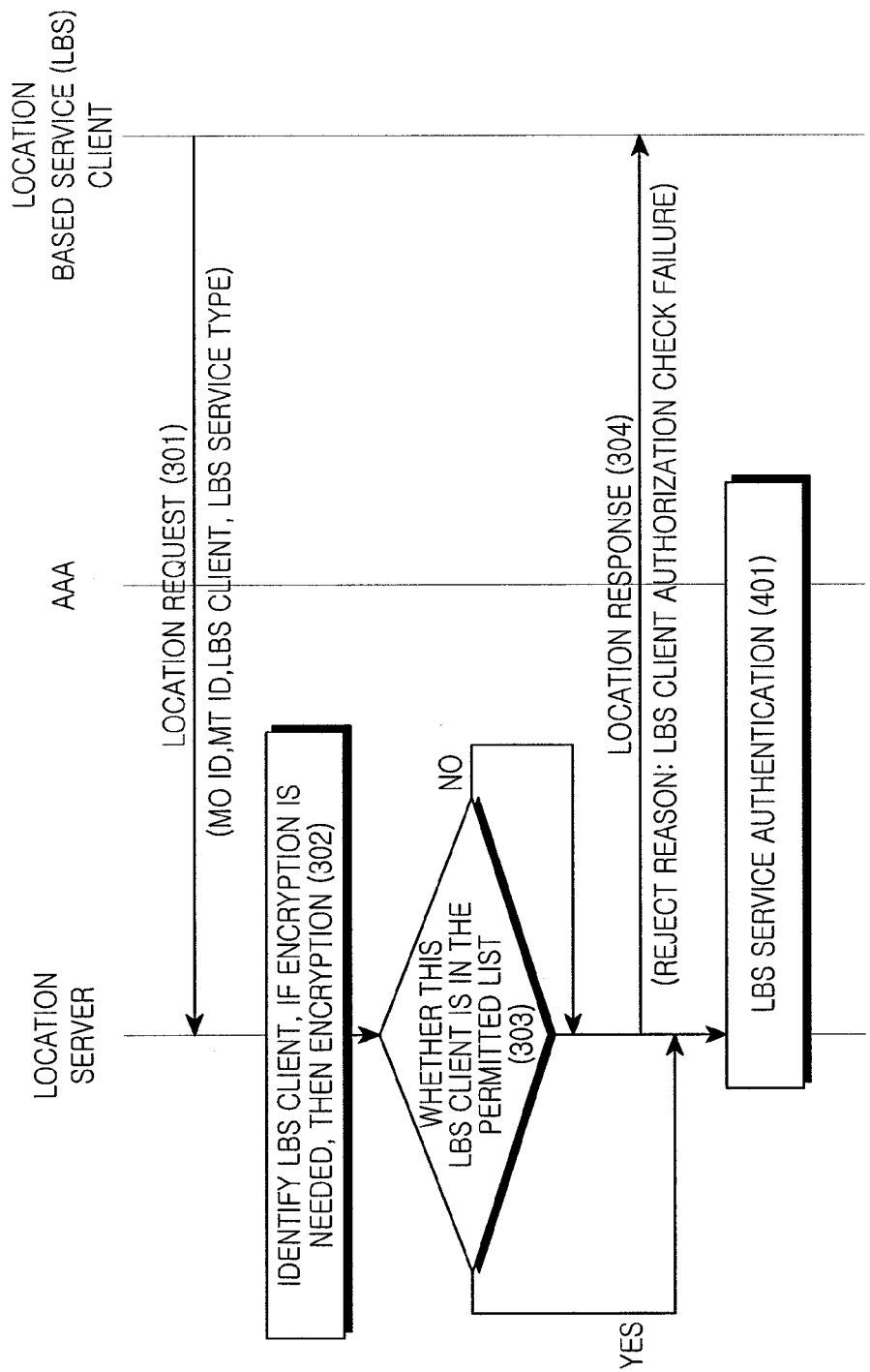
FIG. 3 shows a flow of authorization checking on LBS client.

The block diagram of Solution 1 for implementing LBS authentication and authorization in Wimax network in present invention is shown in FIG. 2. Here, the involved network entities and their basic functions are described as follows.

LA 201

LA is a module provided in base station (BS) and responsible for location assessment.

LC 202

LC is a module provided in an access service network gateway (ASN GW) and responsible for location coordination and control, such as selecting a location algorithm, initiating LBS assessment and location calculation, etc.

AAA 203

AAA is an existing network entity in Wimax network but not a LBS-specific entity. The following modules need to be added to the AAA entity.

The LBS Subscription Information Memory 203-1

This module is general a database for storing the subscription information on LBS services of a user in Wimax network. The module can be implemented as several LBS-related parameters that can be added into the existing database in AAA or as a separate LBS subscription service database.

The Authentication Processing Module 203-2

This module is responsible for authentication on LBS services, such as checking whether LBS services requested by a user are the subscribed LBS services, checking the corresponding QoS, etc.

LS 204

LS is provided in a connection service network (CSN) and primarily functions to receive a LBS request from a LBS client and to serve as a gateway through which the Wimax network interacts with an external network. In addition, location calculation can also be carried out in LS. The following modules need to be added to LS for LBS authentication and authorization checking.

The Authorization List Memory 204-1

This module is general a database for storing the subscription information on LBS services of a user in Wimax network. The module can be implemented as several LBS-related parameters that can be added into the existing database in AAA or as a separate LBS subscription service database.

The Authorization Checking Module 204-2

This module functions to check whether a MO MS is authorized to obtain a MT MS's location information.

LBS Client 204

LBS client is provided in a network external to Wimax (e.g., the international inter-connection network, abbreviated as Internet) and primarily functions to initiate a LBS request.

The implementation flows of Solution 1 are as follows:

flow 1, performing authorization checking on the LBS client;

flow 2, performing authentication on LBS services;

flow 3, performing authorization checking on the MO MS.

In present invention, the method for LBS authentication and authorization checking in Wimax network is not limited to the above three flows. Certain flows or some flows within certain flow can be selectively implemented by operators according to their particular LBS services and network conditions. In addition, although the sequence through which the LBS authentication and authorization checking in Wimax network of present invention is performed is recommended as flow 1→flow 2→flow 3, present invention is not limited to the sequence. And operators can properly adjust the sequence of the above flows or the sequence of particular message flows in certain flow according to according to their particular LBS services and network conditions. Moreover, the particular parameters contained in the messages in the message flows of the following flow 1, flow 2 and flow 3 are only for illustration. Operators can adopt them selectively, design other new parameters or add other parameters.

Detailed message flow in the flow 1 of performing authorization checking on the LBS client is illustrated in FIG. 1. This flow is applicable to only a location request initiated by a LBS client, whereas the flow 2 is directly implemented for a location request initiated by a MS. Detailed processing steps in message flow of the flow 1 are as follows.

301 A user starts a particular LBS service, such as a location searching service for searching another party's location initiated in the Internet. According to the particular LBS service, a LBS client external to Wimax sends a location request message to LS, with the message contains such parameters as the identifier of the MS that initiates the location request (MO ID), the identifier of the located or target MS (MT ID), the LBS client, the LBS service type, etc.

302 Having received the location request from the LBS client, LS parses it and identifies the LBS client. To prevent any hacker from intercepting and stealing the LBS client and using it to send a request to LS, some critical fields, such as the LBS client, etc., in the location request can be encrypted. In this case, it is necessary to first decrypt the request.

303 LS performs query in the module 204-1 to check whether the requesting LBS client has been permitted by LS. If yes, the flow goes to Step 401 and the subsequent steps in the flow 2, otherwise, the flow goes to Step 304.

304 LS sends a location response message to the LBS client, with the message indicating that the location request is rejected and carrying the reason value that the LBS client authorization checking fails.

Figure 4:
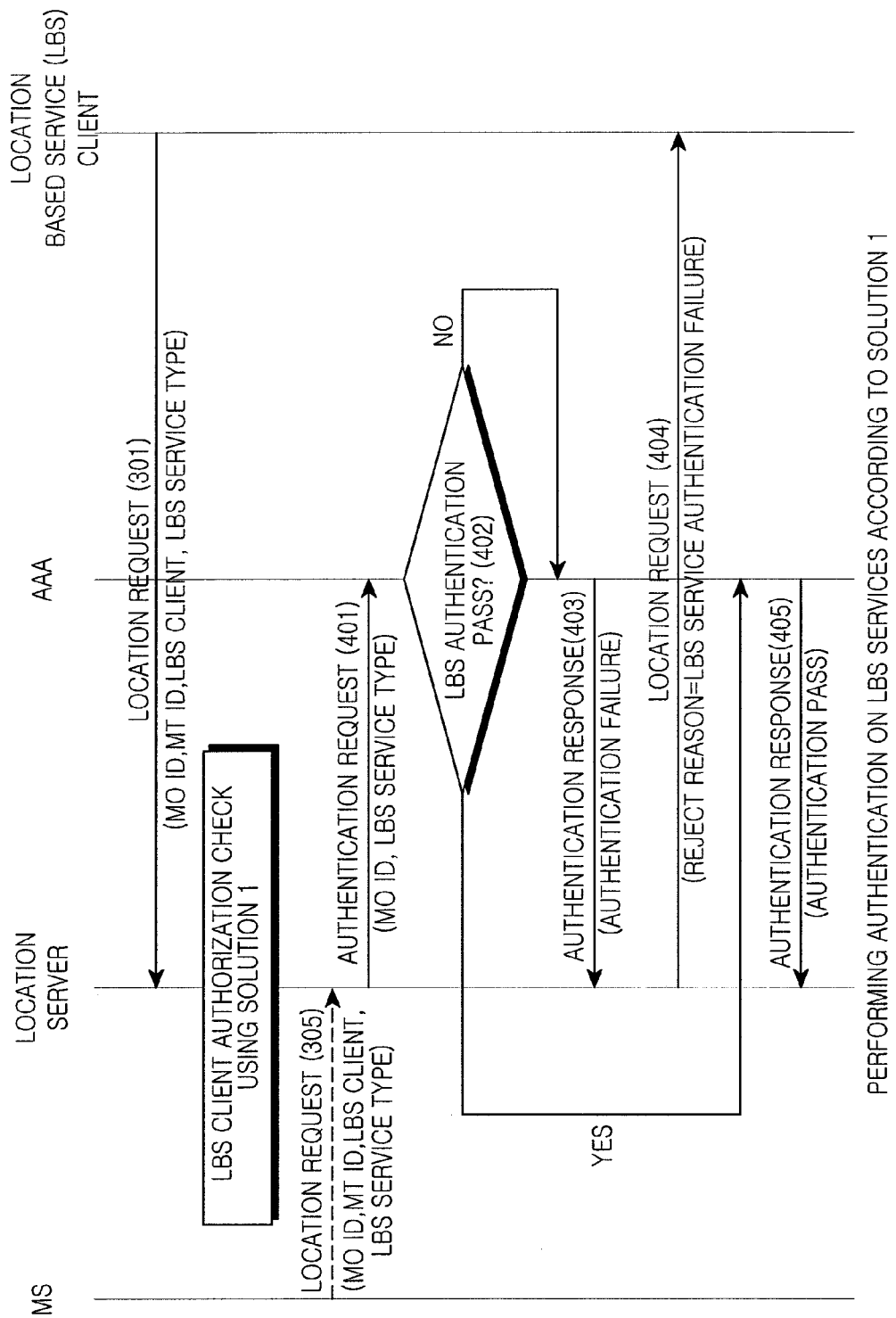
FIG. 4 shows a message flow of LBS authentication.

The message flow in flow 2 of performing authentication on LBS services is illustrated in FIG. 4. For a location request initiated by a LBS client, the flow 2 is performed after the authorization checking on the LBS client through Steps 301-305 of the flow 1. For a location request initiated by a MS in 305, the flow goes directly to the processing of the flow 2 as soon as the message in 305 is received. Detailed processing steps in the message flow of the flow 2 are as follows.

401 LS sends an authentication request to AAA, with the request including such parameters as MO ID, LBS service type, etc.;

402 Having received the authentication request from LS, AAA starts the authentication processing module 203-2 to take the MO ID as an index (this approach is recommended in present invention, any other approach can be selected by operators) and search a database for MO MS's subscribed LBS service information and related QoS. If the requested LBS and related QoS are consistent with the subscription content, the LBS authentication passes, and the flow goes to 405; otherwise, the flow goes to 403.

403 AAA returns an authentication response to LS, with the response indicating that the authentication fails and carrying a particular reason value. Here, the classification and settings of reason values are specified by operators themselves.

404 LS returns a location response message to the LBS client, with the message indicating that the location request fails and carrying a reason value that LBS authentication fails.

405 AAA returns an authentication response message to LS, with the message indicating that LBS authentication in AAA passes, and the flow goes to the flow 3.

Figure 5:
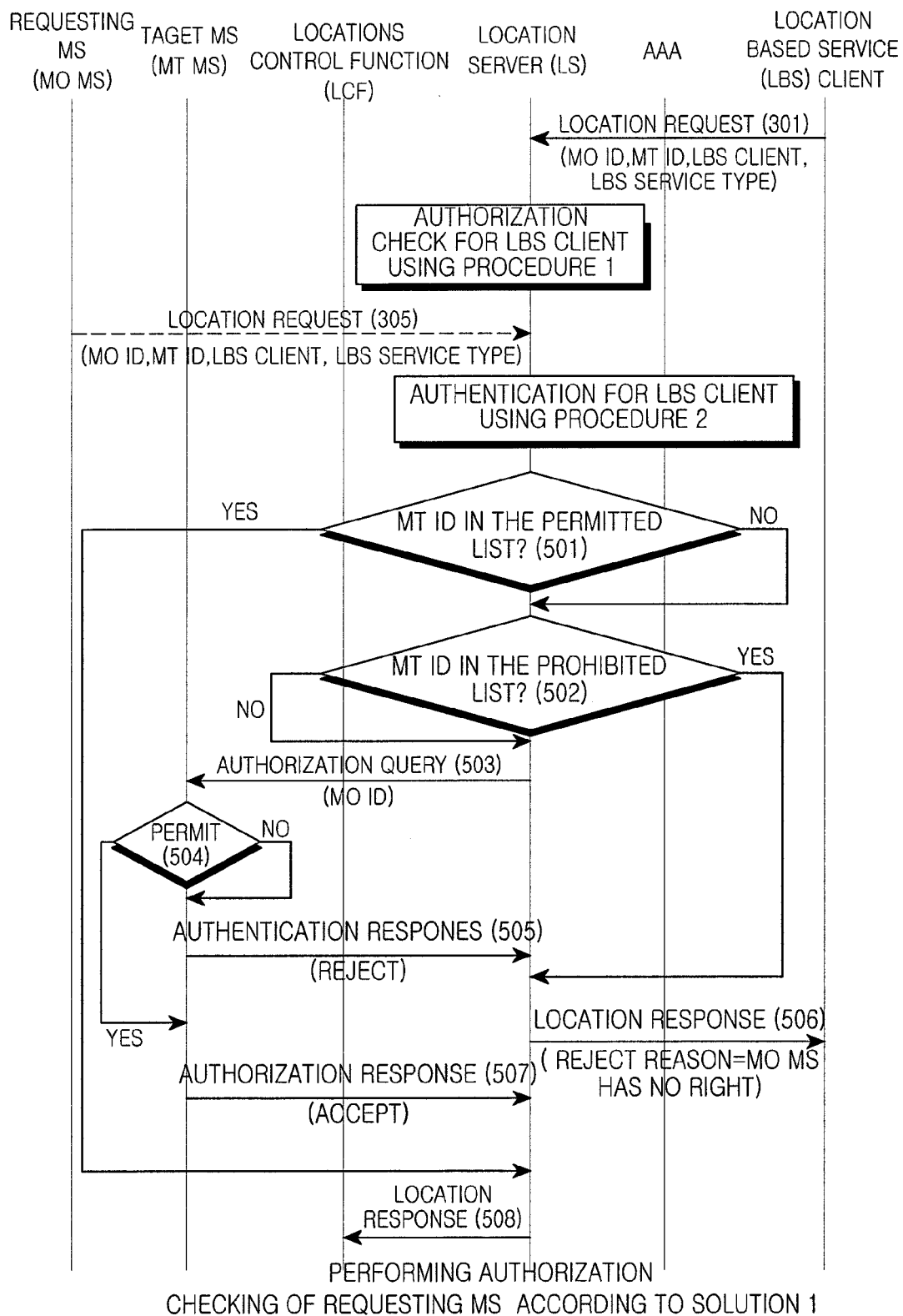
FIG. 5 shows a flow of LBS authorization checking on MO MS.

The flow 3 of performing authorization checking on MO MS is illustrated in FIG. 5. This flow is implemented after the authorization checking on the LBS client in the flow 1 passes and the LBS authentication in the flow 2 passes. Detailed processing steps in the authorization checking on MO MS are as follows.

501 LS searches in the module 204-1 to find whether the MT ID is in the permission list or not, if yes, the flow goes to 508, otherwise to 502.

502 LS searches in the module 204-1 to find whether the MT ID is in the prohibition list or not, if yes, the flow goes to 506, otherwise to 503;

503 LS sends an authorization query message to MT MS, with the message carrying the parameter MO ID.

504 Through a user interface or any other approach, the MT MS asks the user if the MO MS is permitted to locate the MS itself. The user can make a choice through the user interface or any other approach. If the user chooses "Yes", the flow goes to 507, otherwise to 505.

505 the MT MS sends an authorization response message to LS to indicate that the request is rejected by the user.

506 LS sends a location response message to the LBS client, with the message indicating that the location request fails and carrying a reason value that the MO MS has no right to locate the target MO.

507 If the MT MS chooses that the MO MS is permitted to locate the MT MS, it sends an authorization response message to LS, with the message carrying the identifier "pass".

508 LS sends a location request message to LC to trigger subsequent processes like location assessment, location calculation, etc.

Solution 2: AAA implements LBS authentication and authorization checking on location requestor.

Figure 6:
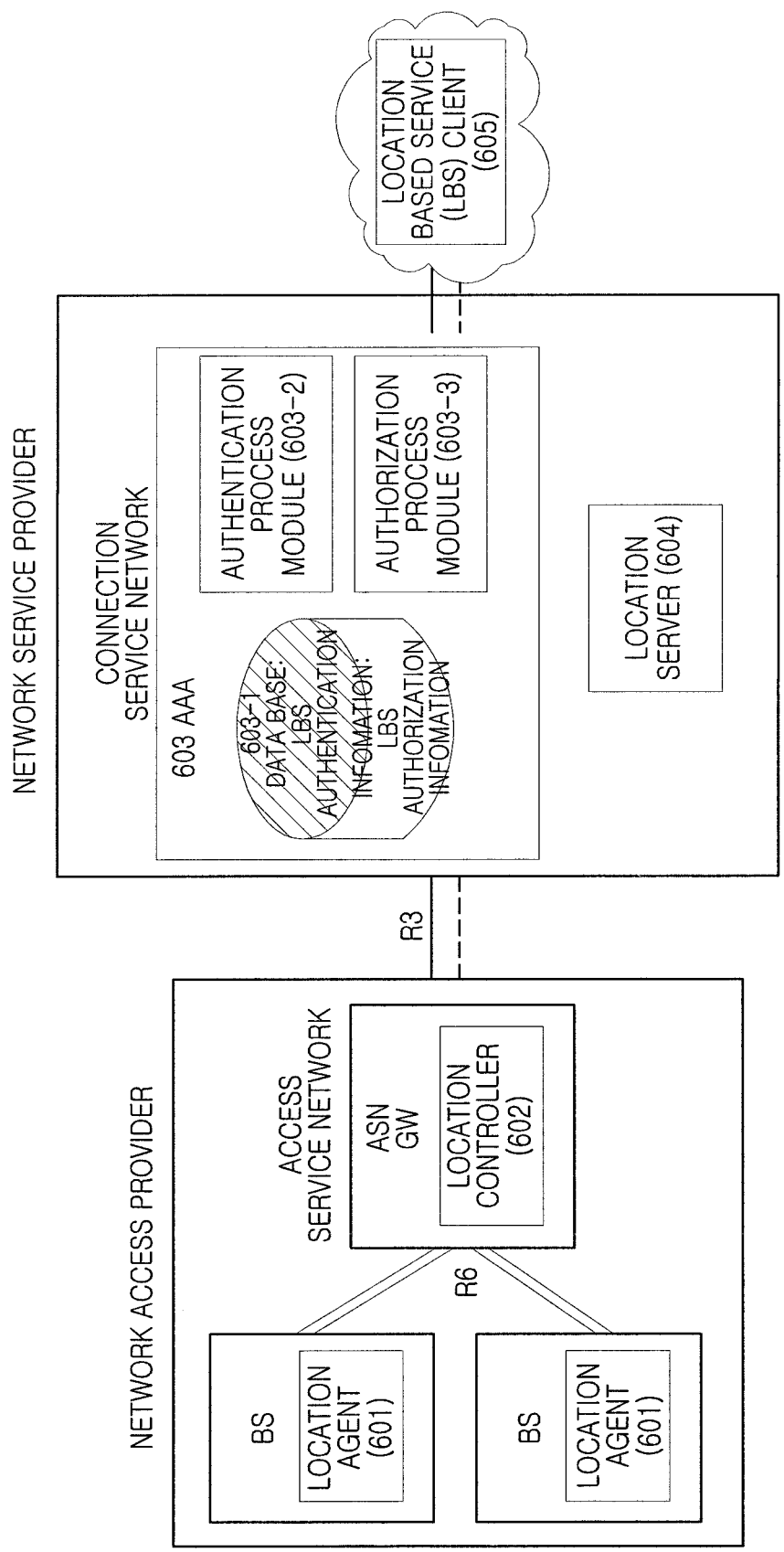
FIG. 6 is a block diagram of Solution 2.

The block diagram of Solution 2 for implementing LBS authentication and authorization checking in Wimax network of present invention is shown in FIG. 6. Here, the involved network entities and their functions are described as follows.

LA 601

LA is a module provided in base station (BS) and responsible for location assessment.

LC 602

LC is a module provided in an access service network gateway (ASN GW) and responsible for location coordination and control, such as selecting a location algorithm, initiating LBS assessment and location calculation, etc.

AAA 603

AAA is an existing network entity in Wimax network but not a LBS-specific entity. The following modules need to be added to the existing AAA entity or to be extended in terms of their functions.

The Authentication and Authorization Information Memory 603-1

The authentication and authorization information memory is generally a medium for storing data or any other storage medium. It can be generally implemented by adding the corresponding function in the existing AAA database, i.e., to add LBS authentication information and LBS authorization information in the AAA memory in existing Wimax network. It also can be designed as an independent database or memory.

The Authentication Processing Module 603-2

This module is responsible for authentication on LBS services, such as checking whether LBS services requested by a user are the subscribed LBS services, checking the corresponding QoS, etc.

The Authorization Checking Module 603-3

This module is responsible for checking whether an external LBS client or a MO MS is authorized to obtain a MT MS's location information or not.

LS 604

LS is provided in a connection service network (CSN) and primarily functions to receive a LBS request from a LBS client and to serve as a gateway through which the Wimax network interacts with an external network. In addition, location calculation can also be carried out in LS. The following modules need to be added to LS for LBS authentication and authorization checking.

LBS Client 204

LBS client is provided in a network external to Wimax (e.g., the international inter-connection network, abbreviated as Internet) and primarily functions to initiate a LBS request.

The implementation flows of Solution 2 are as follows:
flow 1, the flow that LBS authentication and authorization checking in Wimax network are successful;
flow 2, the flow that LBS authentication and authorization checking in Wimax network are failed.

First, an explanation is given to the particular flows and messages in the following embodiments of present invention. Although it is recommended to follow the sequence of message transmission and reception in the embodiment in implementing the method for providing LBS in Wimax network, present invention is not limited to such sequence. That is, the method for providing LBS in Wimax network is not necessarily perform in such sequence. Operators can select certain flows or some flows in certain flow according to their particular LBS services and network conditions, or properly adjust the order for certain message transmission according to particular devices or LBS operation situation. Moreover, parameters included in the messages applied in this embodiment are only for illustration. Operators can adopt them selectively or design other new parameters or add any other parameters. In present invention, no restriction is imposed on the format of message or its parameter, while the format can be defined by operators according to particular applications.

Figure 7:
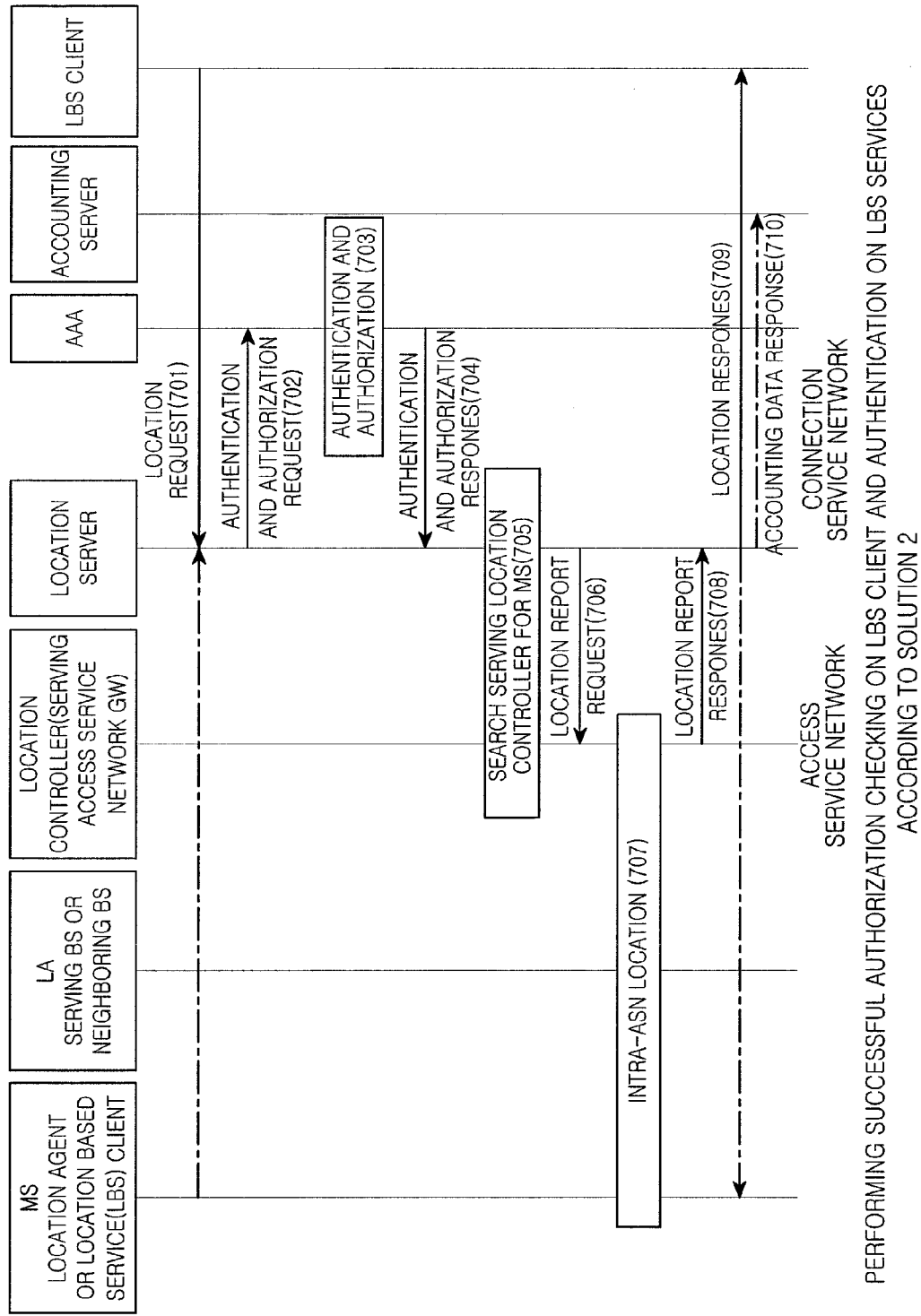
FIG. 7 shows a flow of successful LBS authentication and authorization checking in Wimax in Solution 2.

The flow that LBS authentication and authorization checking succeeds is illustrated in FIG. 7. It includes the following steps.

701 A MS or LBS client initiates a LBS service. Either the LBS client or MS can send a location request message to the location server LS, with the message including such parameters as the identifier of the MS (MO ID) that initiates the location request, the identifier of the located or target MS (MT ID), the LBS client, the LBS service type, etc.

702 LS sends an authentication and authorization checking request message to AAA to request for authorization checking on the LBS service and the location requestor.

703 The authentication and authorization checking is performed in AAA.

704 An authentication and authorization checking response is sent back to LS, with the response including the result of authentication and authorization checking, indicating that the authentication and authorization checking succeeds or that the authentication and authorization checking fails.

705 If the authentication and authorization checking succeeds, the serving LC is found for the MS.

706 After the serving LC for the target MS is found, LS sends a location report request to the serving LS.

707 The location determination process inside the ASN is performed.

708 After a successful execution, location information on the target MS can be obtained. LC reports this location information to LS.

709 LS sends a location response message to the location requestor (MS or LBS client) to return the actual location information of the target MS.

710 LS sends accounting data update to an account server to deduct the fees for this LBS service from the account of the requestor. This step is generally optional. For some special requests like emergency service, legal listening, etc., it is not necessary to perform this step, since no fee should be paid for such requests.

The following mechanism can be adopted to perform authentication and authorization checking in AAA: for each user, saving in AAA the LBS-related subscription information, the list of LBS clients permitted to access, the list of MSs permitted to access and the list of MSs prohibited from access; if a request comes from an external LBS client, first performing authorization checking on the external LBS client by querying the list of LBS clients permitted to access; if the authentication on the external LBS client succeeds, permitting the request, otherwise rejecting the request; after that, performing authentication on the LBS service; if the location request sent from MS, directly performing LBS authentication by checking the subscription information in AAA to examine whether the requested LBS service and quality of service (QoS) are included in the subscription information or not; finally, performing authorization checking on the MO MS by comparing the access-permitted list and the access-prohibited list stored in AAA.

Figure 8:
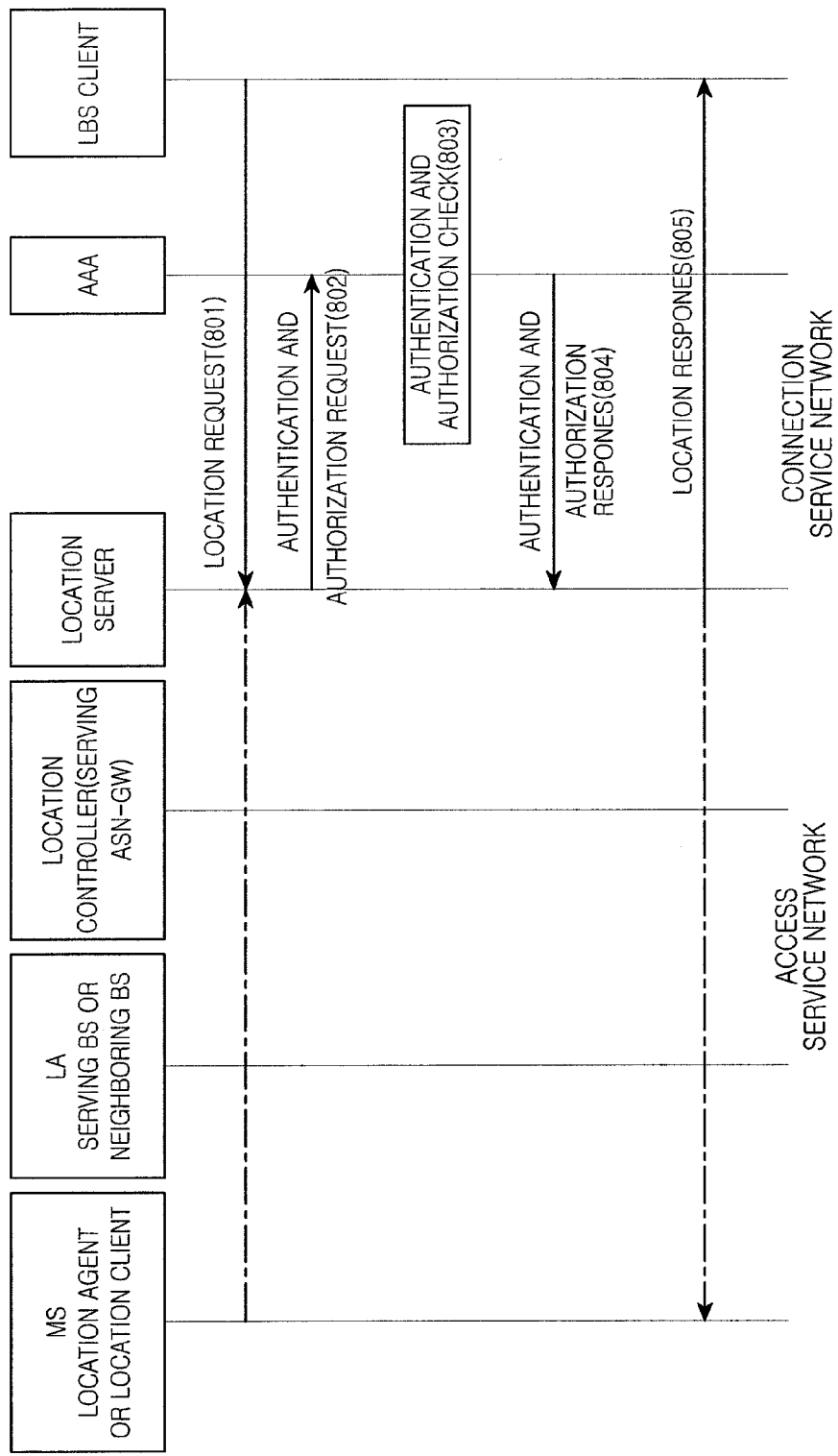
FIG. 8 shows a flow of failed LBS authentication and authorization checking in Wimax in Solution 2.

The flow that LBS authentication and authorization checking process fails is illustrated in FIG. 8. It includes the following steps.

801 A MS or LBS client initiates a LBS service. Either the LBS client or MS can send a location request message to the location server LS, with the message including such parameters as the identifier of the MS (MO ID) that initiates the location request, the identifier of the located or target MS (MT ID), the LBS client, the LBS service type, etc.

802 LS sends an authentication and authorization checking request message to AAA to request for authorization checking on the LBS service and the location requestor.

803 The authentication and authorization checking is performed in AAA.

804 An authentication and authorization checking response is sent back to LS, with the response including the result of authentication and authorization checking, indicating that the authentication and authorization checking succeeds or that the authentication and authorization checking fails.

805 If the authentication and authorization checking fails, a location response is sent to the location requestor (either external LBS client or MS) to indicate that the location request fails. The response contain the reason for the failure, which can be set as that the authentication and authorization checking fails or some other more detailed reasons, such as the LBS client has no right, the requesting MS has no right, etc.

In present invention, two solutions have been proposed for the implementation of LBS authentication and authorization checking in Wimax network.

With Solution 1, if the location request comes from a LBS client that is not permitted to access, the request is rejected by LS. Therefore, only authorized legal LBS clients can access LS. Moreover, this method can be adopted to perform LBS authentication in AAA to guarantee that Wimax network only offers services to MO MS's subscribed LBS services. In addition, the list of MSs permitted to access, the list of MSs prohibited from access are saved in LS. If the MO MS is in the list of MSs prohibited from access, LS directly rejects the location request. If the MO MS is in the list of MSs permitted to access, LS permits this MS to locate the target MS. If the MO MS is neither in the list of MSs permitted to access nor in the list of MSs prohibited from access, the MS is queried. If the user permits this request, the MO MS authorization checking passes; otherwise, the request is rejected. In this way, a convenient method is offered to guarantee only authorized MO MSs can locate MS.

With Solution 2, when LS receives a location request from a MS or a LBS client, it sends an authentication and authorization checking request to AAA. And the authentication and authorization checking process is implemented in AAA. If the authentication and authorization checking passes, the serving LC is found for the MS. The inner-ASN location determination process is implemented in the serving ASN. After the location of the target MS is obtained, this information is first reported to LS, and then LS reports it to the location requestor. If the authentication and authorization checking fails, a location response is directly sent to the location requestor to indicate the failure of location. From the descriptions above, it is easy to understand that the method proposed in present invention for LBS authentication and authorization checking in Wimax network considerably strengthen the security for LBS in Wimax network, protect the privacy for subscribed LBS users, and fill up the blankness in the current Wimax standards.

The invention claimed is:

1. A system for performing authentication and authorization checking on Location-Based Service (LBS) in a Worldwide interoperability for Microwave Access (WiMAX) network, the system comprising
    an Access Service Network (ASN) comprising:
        a Location Agent (LA) adapted to perform location measurement; and
        a Location Controller (LC) adapted to initiate LBS measurement, location calculation; and
    a Connection Service Network (CSN) comprising:
        an authentication and authorization information memory in an Authentication/Authorization/Accounting module (AAA);
        an authentication processing module included in the AAA and responsible for authentication on a LBS service; and
        an authorization checking processing module included in the AAA and responsible for authorization checking on a LBS client and a MS requesting for LBS.

2. The system according to claim 1, wherein the authentication and authorization information memory in the AAA is designed as an upgraded database by adding LBS subscription information to an existing database in the AAA, or as an independent memory module.

3. The system according to claim 1, wherein the AAA performs authentication on the LBS service so as to guarantee that only a subscribed LBS service can pass the authentication.

4. The system according to claim 1, wherein the authorization checking processing module guarantees only a Requesting MS (MO MS) that is permitted by the MT MS can locate the MT MS.

5. The system according to claim 3, wherein an operator can add, delete or modify the LBS subscription information in the AAA according to a user's requirement.

6. The system according to claim 1, wherein the AAA stores LBS subscription information and LBS privacy related information that includes a list of devices permitted by a Target Mobile Station (MT MS) to locate the MT MS.

7. The system according to claim 6, wherein the LBS privacy related information includes an authorization list in the AAA saves a list of LBS clients permitted to locate an MS.

8. The system according to claim 6, wherein the LBS privacy related information includes an authorization list in the AAA saves a list of Requesting MSs (MO MSs) permitted to locate an MS.

9. The system according to claim 6, wherein the LBS privacy related information includes an authorization list in the AAA saves a list of Requesting MSs (MO MSs) prohibited from locating an MS.

10. The system according to claim 7, wherein the AAA performs authorization checking on an external LBS client and on a MS requesting for location service.

11. The system according to claim 8, wherein a user can add, delete or modify the list of MO MSs permitted to locating in a Location Server module (LS).

12. The system according to claim 9, wherein a user can add, delete or modify the list of MO MSs prohibited from locating in a Location Server module (LS).

13. A method for successful authentication and authorization checking on Location-Based Service (LBS) in a Worldwide Interoperability for Microwave Access (WiMAX) network, the method comprising:
    1) sending by a Location Server module (LS) an authentication and authorization checking request message to an Authentication/Authorization/Accounting module (AAA), is included in a Connection Service Network (CSN) after the LS receives a location request;
    2) performing authentication and authorization checking in the AAA;
    3) finding a serving Location Coordination and Control module (LC), which is included in an Access Service Network (ASN), for a MS if the authentication and authorization checking succeeds;
    4) sending by the LS a location report request to the serving LC;
    5) performing an intra-Access Service Network (intra-ASN) location determination process;
    6) sending by the LC a location report response to the LS, with the response containing the obtained location of the MT MS;
    7) sending by the LS a location response to the location requestor; and
    8) sending by the LS updated accounting data to an accounting server.

14. The method according to claim 13, wherein, during the process of the authentication and authorization checking by the AAA, the AAA first performs authentication on a LBS service with respect to a location request initiated by a MS.

15. The method according to claim 13, wherein, during the process of the authentication and authorization checking by the AAA, the AAA performs authentication on a LBS service after the authorization checking on an external LBS client succeeds, if a location request is initiated by the external LBS client.

16. The method according to claim 13, wherein, during the process of the authentication and authorization checking by the AAA, the authentication on a LBS service is determined in the AAA whether the LBS service is a subscribed service and whether its Quality of Service (QoS) matches.

17. The method according to claim 13, wherein, during the process of the authentication and authorization checking by the AAA, the AAA performs authorization checking on a Requesting MS (MO MS) after the authentication on an external LBS client and the LBS service succeeds, if a location request is initiated by the external LBS client.

18. The method according to claim 13, wherein, during the process of the authentication and authorization checking by the AAA, the AAA performs authorization checking on a Requesting MS (MO MS) after the authentication on the LBS service succeeds, if a location request is initiated by a MS.

19. The method according to claim 13, wherein, during the process of the authentication and authorization checking by the AAA, the authorization checking on a Requesting MS (MO MS) is determining whether the user who initiates the location request has the right to locate a target user.

20. The method according to claim 13, wherein, during the process of the authentication and authorization checking by the AAA, for the authorization checking on a Requesting MS (MO MS), it is first determined whether the MO MS is in the access-permitted list of a MT MS, and if yes, the authorization checking on the MO MS succeeds.

21. The method according to claim 13, wherein, during the process of the authentication and authorization checking by the AAA, for the authorization checking on a Requesting MS (MO MS), it is first determined whether the MO MS is in the access-permitted list of a MT MS, and if not, it is determined whether the MO MS is in the access-prohibited list of the MT MS; if yes, the authorization checking on the MO MS fails, and a location response message is directly sent to the LBS initiator, with the message indicating that the location fails and carrying a reason value that the authorization checking on the MO MS fails.

22. The method according to claim 13, wherein, during the process of the authentication and authorization checking by the AAA, for the authorization checking on a Requesting MS (MO MS), it is first determined in the LS whether the MO MS is in the access-permitted list of a MT MS, and if not, it is determined whether the MO MS is in the access-prohibited list of the MT MS; if not, the MT MS is queried as to whether it permits the MO MS to locate it; if the user of the MT MS can make a choice of permission or prohibition.

23. The method according to claim 13, wherein, during the process of the authentication and authorization checking by the AAA, for the authorization checking on a Requesting MS (MO MS), it is first determined whether the MO MS is in the access-permitted list of a MT MS, and if not, it is determined whether the MO MS is in the access-prohibited list of the MT MS; if not, the MT MS is queried as to whether it permits the MO MS to locate it; if the user of the MT MS chooses permission, the authorization checking on the MO MS succeeds.

24. The method according to claim 13, wherein, during the process of the authentication and authorization checking by the AAA, for the authorization checking on a Requesting MS (MO MS), it is first determined whether the MO MS is in the access-permitted list of a MT MS, and if not, it is determined whether the MO MS is in the access-prohibited list of the MT MS; if not, the MT MS is queried as to whether it permits the MO MS to locate it; if the user of the MT MS chooses prohibition, the authorization checking on the MO MS fails; the MT MS sends to the LS a response to the query to indicate that the location is prohibited; then the LS sends a location response message to the LBS initiator, with the message indicating that the location fails and carrying a reason value that the authorization checking on the MO MS fails.

25. The method according to claim 13, wherein the step of performing authentication and authorization checking in the AAA comprises checking an authentication and authorization information memory in the AAA that stores LBS subscription information and LBS privacy related information that includes a list of devices permitted by a Target Mobile Station (MT MS) to locate the MT MS.

26. A method for failed authentication and authorization checking on Location-Based Service (LBS) in a Worldwide Interoperability for Microwave Access (WiMAX) network, the method comprising:

1) Sending by LBS Client a Location Request to a Location Server module (LS), which is included in a Connection Service Network (CSN), in order to locate a Mobile Station (MS);
2) sending by the LS an authentication and authorization checking request to an Authentication/Authorization/Accounting module (AAA), which is included in the CSN, after the LS receives a location request;
3) performing authentication and authorization checking in the AAA; and
4) sending by the LS a location response to a location request initiator, if the authentication and authorization checking fails.

27. The method according to claim 26, wherein the LS sends the authentication and authorization checking message to the AAA after receiving the locating request from a MS or a LBS client.

28. The method according to claim 26, wherein, in the WiMAX network, the AAA performs authentication on a LBS service to guarantee that only a subscribed LBS can obtain the LBS service.

29. The method according to claim 26, wherein, in the WiMAX network, the AAA performs authorization checking on LBS to guarantee that only a legal LBS client can obtain the LBS service.

30. The method according to claim 26, wherein, in the WiMAX network, the AAA performs authorization checking on a MS requesting for LBS to guarantee that only a legal MS requestor can obtains the LBS service.

31. The method according to claim 26, wherein the location response includes the indication of location failure and carrying a reason value for failure.

32. The method according to claim 26, wherein, in the WiMAX network, if the authorization checking on the LBS client does not succeed in the AAA, the authentication and authorization checking fails, and the LS sends a location response message to the location requestor, with the message indicating the failure of location and carrying a reason value for failure.

33. The method according to claim 26, wherein, in the WiMAX network, if the authorization checking on the requesting MS does not succeed in the AAA, the authentication and authorization checking fails, and the LS sends a location response message to the location requestor, with the message indicating the failure of location and carrying a reason value for failure.

34. The method according to claim 26, wherein, during the location processing process in the WiMAX network, if the authentication or the authorization checking does not succeed, a location response message is sent to the location requestor, with the included reason for failure being that the authentication and authorization checking fails.

35. The method according to claim 26, wherein, during the location processing process in the WiMAX network, if the authentication or the authorization checking does not succeed, a location response message is sent to the location requestor, with the included reason for failure being that the client requesting for location has no right or the requesting MS has no right.

36. The method according to claim 26, wherein the step of performing authentication and authorization checking in the AAA comprises checking an authentication and authorization information memory in the AAA that stores LBS subscription information and LBS privacy related information that includes a list of devices permitted by a Target MS (MT MS) to locate the MT MS.

* * * * *